Dec. 17, 1968  V. M. HALSALL  3,416,969
BATTERY CONSTRUCTION
Filed Nov. 14, 1966
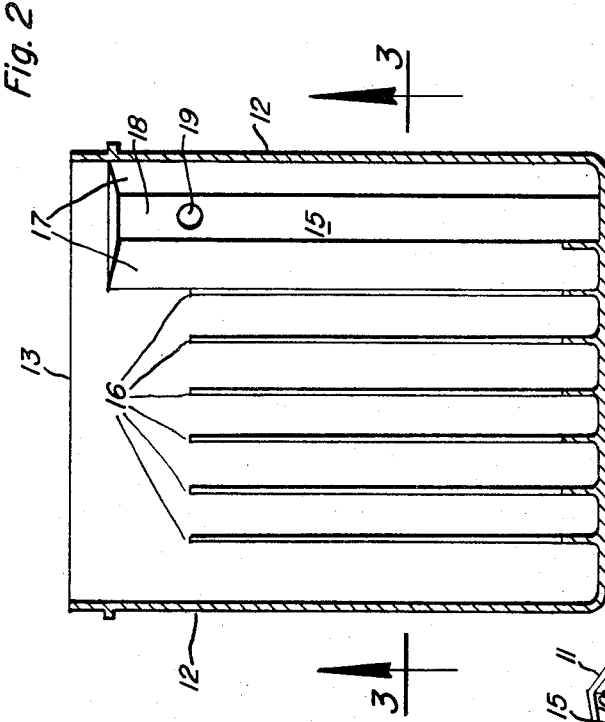
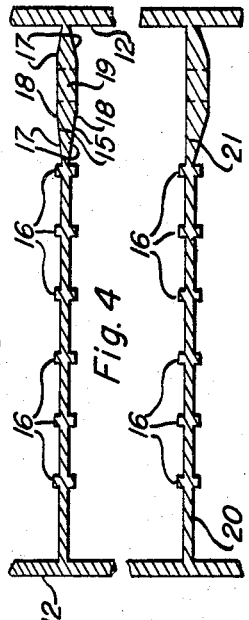
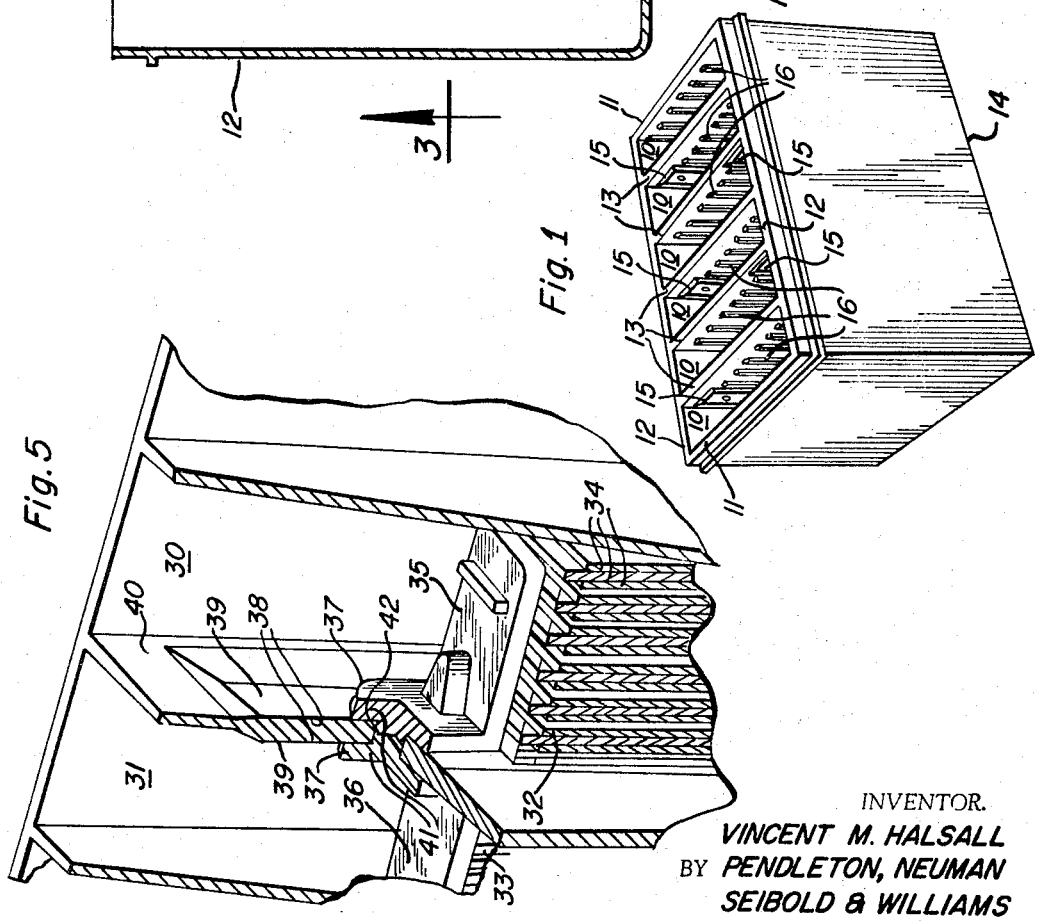
INVENTOR.
VINCENT M. HALSALL
BY PENDLETON, NEUMAN
SEIBOLD & WILLIAMS
ATTORNEYS

United States Patent Office 3,416,969
Patented Dec. 17, 1968

3,416,969
BATTERY CONSTRUCTION
Vincent Michael Halsall, Bayside, Wis., assignor to Globe-Union Inc., Milwaukee, Wis., a corporation of Delaware
Filed Nov. 14, 1966, Ser. No. 593,910
15 Claims. (Cl. 136—134)

This invention relates to batteries and particularly to a novel container for a storage battery.

Typical prior art storage batteries as used for example in automobile electrical systems are made of a composition including rubber. Such cases are heavy and require relatively thick walls for sufficient strength. Recent improvements in battery construction techniques have resulted in lightweight cases made of thermoplastic material such as polypropylene. Thermoplastic cases can be made with relatively thin walls which can increase the electrical capacity of the battery over that of conventional rubber cases by increasing the volume available for acid in the cavities containing the battery cells. Also, techniques have been developed for electrically connecting adjacent battery cells through the walls separating the cells. This type of connection eliminates the need for external intercell connections which, in the past, have been made above the battery cover. These improvements are described respectively in two copending applications, one entitled Method and Apparatus For Fabricating Battery Cases having Ser. No. 608,104 and filed Jan. 9, 1967, and the other having Ser. No. 132,660, and filed Aug. 21, 1961, both assigned to the assignee of the present application.

An object of the present invention is to provide an improved battery case which combines the advantages of lightweight, thin wall construction and through the wall intercell connections.

A further object of the present invention is to provide an improved battery with an improved interior wall structure.

A further object of the present invention is to provide a lightweight battery case having improved structural supporting characteristics.

A further object of the present invention is to provide an improved battery case which enables reliable intercell connections through the partition walls.

These and other objects of the present invention are accomplished by providing a thin wall battery case which includes a buttress on at least one side of each partition wall in the region of the intercell connection. Preferably, where the wall thickness is less than .1 inch, the buttress increases the thickness to approximately .120 inch. In one embodiment, buttresses are formed on both sides of the partition wall while in a second embodiment a buttress is formed on only one side of the wall. Furthermore, additional lateral support of both the walls and the battery cells is provided by a plurality of rib members distributed over the partition walls and the interiors of the side walls of the case.

A more detailed description of the present invention will be given with reference to the accompanying drawing in which:

FIG. 1 is an isometric view of a battery case constructed according to the present invention.

FIG. 2 is a cross-sectional view of the battery case shown in FIG. 1 which illustrates the side of one of the partition walls of the case.

FIG. 3 is a cross-sectional view taken along line 3—3 in FIG. 2.

FIG. 4 is a cross-sectional view of the wall structure of a second embodiment of the present invention.

FIG. 5 is an isometric view, partially in section, of a battery constructed according to the present invention.

The battery case shown in FIG. 1 is an embodiment of the present invention which may be used, for example, in constructing a twelve volt automobile storage battery. Six battery cell cavities 10 are formed by two pairs of parallel sides 11, 12, five interior or partition walls 13, and a bottom wall 14. The case is constructed of a lightweight thermoplastic material, such as a propylene material (as used herein the term propylene material includes polymers and copolymers of propylene) which enables relatively thin wall construction as described in the copending application entitled Method and Apparatus For Fabricating Battery Cases. The sides 11, 12 of the case may, for example, be .095 inch thick, while the interior walls 13 may be tapered from approximately .090 inch at the bottom of the case to approximately .060 inch at the top of the case. Typically, the overall dimensions of the case are 6 x 8 x 10 inches. It should be understood, of course, that these dimensions are given solely by way of example; the actual dimensions will depend upon the particular use to which the battery case is put.

Each of the five partition walls 13 includes a buttress 15 on one or both of its sides. The buttresses 15 on alternate walls 13 are at opposite sides of the case. Each of the partition walls 13 and the interior faces of the two sides 11 parallel to the partition walls have a plurality of vertically extending rib members 16 projecting therefrom. The details of one embodiment of a partition wall are shown in FIGS. 2 and 3.

The rib members 16, which may for example be .05 inch wide and project approximately .03 inch from both sides of each wall 13, extend along a major part of the wall's vertical length. Again, it should be noted that the particular dimensions will depend on the use to which the battery is put; the given dimensions have been found suitable for automotive batteries of the type described. Each side of the wall 13 has a buttress 15 formed by two tapered edges 17 projecting respectively from one side 12 of the case and from one of the rib members 16 to form a relatively flat surface 18 of approximately the same thickness as the rib members 16. Each buttress extends vertically along the wall 13 to a point slightly above the rib members 16. A hole 19 is formed through the buttresses 15 to enable an intercell connection explained in detail below.

FIG. 4 is a cross sectional view of a second embodiment of a wall 20 constructed according to the present invention. The wall 20 differs from the wall 13 shown in FIG. 3 in that a buttress 21 is formed only on one side of the partition wall. The thickness of the buttress 21 is the same as the combined thicknesses of the two buttresses 15 in FIG. 3. The purpose of this alternate construction is explained below.

The ribs 16 on both sides of the various partition walls 13 and on the two sides 11 parallel to the partition walls 13 provide lateral support for battery cells (not shown), placed within the cavities 10 in constructiong the completed battery. Furthermore, the ribs 16 add strength to the walls 13 and the sides 11 parallel to the walls 13. The lateral support is provided without sacrificing the advantages of thin wall construction, primarily the advantage of increased acid electrolyte volume in the cavities 10 which results in increased battery capacity as compared to conventional thick wall cases. While the rib members 16 provide lateral support, they displace very little electrolyte.

The purpose of the buttresses 15 is to enable a reliable intercell connection to be formed through the interior walls 13 of the battery case. Such a through the wall connection is shown in detail in FIG. 5. FIG. 5 illustrates two adjoining battery cell cavities 30, 31 containing battery cells 32, 33. Each battery cell 32, 33 contains a plurality of positive and negative battery plates 34. The plates 34 are of conventional construction. Like polarity plates are electrically and mechanically connected respectively to strap members 35, 36 which are welded or cast onto the plates 34. The strap 35 on the first cell 32 connects all the positive plates of that cell while the strap 36 on the adjoining cell 33 connects all negative plates. The two straps 35, 36 have vertically extending portions 37 which have faces 38 lying against the buttresses 39 on the partition wall 40. Extending from the faces 38 are projections 41 enabling the two strap members 37 to be welded together in the hole 42 formed in the two buttresses 39. The welding process is preferably a pressure weld as described in copending application Ser. No. 132,660.

I have found that in thin wall thermoplastic batteries, a through the wall connection made with buttresses, as illustrated forms a much more reliable connection than one without buttresses. This is especially true with respect to the sealing properties of the connection. Thus, a through the wall connection formed in a thin thermoplastic wall, for example, less than .10 inch, has a tendency to leak, especially if placed in an environment where the battery case will be subject to vibration. The connection made with buttresses, on the other hand, is very reliable and will not loosen if subjected to ordinary vibration or shock.

Lead acid storage battery cells are generally constructed with one more negative plate than positive plate. Thus, the two end plates of any one cell are both negative plates. The strap connecting the negative plates (strap 36 in FIG. 5) will, therefore, extend somewhat farther beyond the end of the cell than will the strap connecting the positive plates. For this reason it is advantageous to form only one buttress on that side of the intercell wall which contacts the positive plate strap. With this construction, the negtive plates on either side of the intercell wall are approximately equidistant from the wall. The wall 20 shown in FIG. 4 is constructed in this manner. In the completed battery, the positive strap member has a face adjoining the buttress 21 while the negative strap member has a face adjoining the opposite side of the wall. Rib members 16 are again provided on both sides of the wall 20 to add strength to the wall and provide lateral support for the battery cells.

While the invention has been described in detail with respect to preferred embodiments, the invention is not intended to be limited thereto. The scope of the invention is defined by the following claims.

What is claimed is:

1. In a battery having at least two cells, a battery case having a wall separating said cells, said wall including at least one buttress, a hole in said wall extending through said buttress, first and second electrically conductive members having faces lying against opposite sides of said wall and being electrically connected through said hole.

2. The battery case of claim 1 wherein said wall is less than .1 inch and said buttress increases the thickness of said wall to approximately .120 inch.

3. The battery case of claim 1 wherein said buttress is formed on only one side of said wall.

4. The battery case of claim 1 wherein buttresses are formed on both sides of said wall.

5. The battery case of claim 1 wherein said buttress extends vertically along said wall.

6. The battery case of claim 1 further including a plurality of rib members distributed over said wall.

7. The battery case of claim 1 wherein said wall is formed of a thermoplastic material.

8. The battery case of claim 1 wherein said wall is formed of propylene material.

9. The battery case of claim 1 wherein said case includes two sides approximately parallel to said wall and both said sides and said wall have a plurality of rib members projecting therefrom.

10. A battery having at least two cells, a wall separating said cells, said wall being generally less than .1 inch thick, at least one side of said wall having a vertically extending buttress for increasing the thickness of said wall to approximately .120 inch, a hole in said wall extending through said buttress, first and second electrically conductive members having faces lying against opposite sides of said wall in the vicinity of said hole and electrically connected through said hole, and a plurality of vertically extending, laterally projecting rib members distributed along said wall.

11. A battery comprising a plurality of electrical cells each having first and second straps positioned thereon, said first strap connecting positive plates of the cell, said second strap connecting negative plates of the cell, said straps including post members having faces in a vertical plane, a plurality of intercell walls separating said cells, said walls being less than .1 inch thick, a vertically extending buttress on each of said walls, said buttress increasing the thickness of the wall to approximately .120 inch, a hole in each of said buttresses, the faces of opposite polarity posts of adjoining cells being positioned against the intercell wall at said buttress and being electrically connected through said hole.

12. The battery of claim 11 wherein said walls further include a plurality of vertically extending rib portions distributed over said walls.

13. The battery of claim 11 wherein said buttress is formed on only one side of said wall and that side receives the face of a positive terminal post.

14. The battery of claim 11 wherein said walls are formed of a thermoplastic material.

15. The battery of claim 11 wherein said walls are formed of propylene material.

References Cited

UNITED STATES PATENTS

| 3,364,076 | 1/1968 | Buttke et al. | 136—134 |
| 1,983,219 | 12/1934 | Dunzweiler | 136—166.2 |

FOREIGN PATENTS 564,060  1/1957  Italy.

WINSTON A. DOUGLAS, *Primary Examiner.*

D. L. WALTON, *Assistant Examiner.*

U.S. Cl. X.R.

136—166